US012635015B2

(12) United States Patent
Barton et al.

(10) Patent No.: US 12,635,015 B2
(45) Date of Patent: May 19, 2026

(54) MULTI-LINK OPERATION (MLO) MODE SELECTION

(71) Applicant: Cisco Technology, Inc., San Jose, CA (US)

(72) Inventors: Robert E. Barton, Richmond (CA); Jerome Henry, Pittsboro, NC (US); Juan Carlos Zuniga, Montreal (CA); Malcolm M. Smith, Richardson, TX (US)

(73) Assignee: Cisco Technology, Inc., San Jose, CA (US)

( * ) Notice: Subject to any disclaimer, the term of this patent is extended or adjusted under 35 U.S.C. 154(b) by 316 days.

(21) Appl. No.: 18/359,619

(22) Filed: Jul. 26, 2023

(65) Prior Publication Data

US 2024/0381462 A1 Nov. 14, 2024

Related U.S. Application Data

(60) Provisional application No. 63/501,594, filed on May 11, 2023.

(51) Int. Cl.
| | |
|---|---|
| *H04W 76/15* | (2018.01) |
| *H04W 24/08* | (2009.01) |
| *H04W 28/082* | (2023.01) |
| *H04W 88/08* | (2009.01) |

(52) U.S. Cl.
CPC ........... *H04W 76/15* (2018.02); *H04W 24/08* (2013.01); *H04W 28/082* (2023.05); *H04W 88/08* (2013.01)

(58) Field of Classification Search
None
See application file for complete search history.

(56) References Cited

U.S. PATENT DOCUMENTS

| | | |
|---|---|---|
| 2018/0206174 A1 | 7/2018 | Zhou et al. |
| 2021/0266891 A1 | 8/2021 | Chu et al. |
| 2022/0322145 A1 | 10/2022 | Monajemi et al. |
| 2022/0337338 A1 | 10/2022 | Homchaudhuri et al. |
| 2023/0023779 A1 | 1/2023 | Shafin et al. |
| 2023/0054755 A1 | 2/2023 | Patil et al. |
| 2023/0109759 A1 | 4/2023 | Ratnam et al. |
| 2024/0237107 A1* | 7/2024 | Sedin ..................... H04W 76/15 |

(Continued)

FOREIGN PATENT DOCUMENTS

| | | |
|---|---|---|
| WO | 2022108838 A1 | 5/2022 |
| WO | 2022179696 A1 | 9/2022 |

OTHER PUBLICATIONS

James Gary Griffiths et al., "Prototype of Full Duplex for 802.11," IEEE 802.11-18/1588r1, Dated: Sep. 11, 2018, pp. 1-15.

(Continued)

*Primary Examiner* — Walter J Divito
(74) *Attorney, Agent, or Firm* — Patterson + Sheridan, LLP

(57) ABSTRACT

Techniques for intelligent multi-link operation (MLO) mode selection are provided. One or more metrics for wireless communication in a wireless network is collected. A set of multi-link operation (MLO) modes available for the wireless communication between a station multi-link device (STA MLD) and a first access point multi-link device (AP MLD) in the wireless network is determined. A first MLO mode of the set of MLO modes is selected based on the one or more collected metrics. The wireless communication is performed using the selected first MLO mode.

20 Claims, 7 Drawing Sheets

(56)                    References Cited

U.S. PATENT DOCUMENTS

| | | | | |
|---|---|---|---|---|
| 2024/0334171 | A1* | 10/2024 | Nayak | H04W 74/0808 |
| 2025/0227556 | A1* | 7/2025 | Cariou | H04W 8/24 |
| 2025/0280442 | A1* | 9/2025 | Viger | H04W 52/0216 |

OTHER PUBLICATIONS

Insun Jang et al., "Overview of Full Duplex over Multi-Band (FD-MB) for EHT," IEEE 802.11-18/1908r0, Dated: Nov. 13, 2018, pp. 1-14.

IEEE P802.11 be Tm/D3.1: "Draft Standard for Information Technology—TeleCommunications and Information Exchange Between Systems Local and Metropolitan Area Networks Specific Requirements, Part 11: Wireless LAN Medium Access Control (MAC) and Physical Layer (PHY) Specifications, Amendment 8: Enhancements for Extremely High Throughput (EHT)", P802.11BED3.1, IEEE-SA, Piscataway, NJ USA, vol. 802.11be, No. D3.1, Mar. 27, 2023, pp. 1-1005, XP068200333, p. 252, 510-522, 527, 550, 556-578.

International Search Report and Written Opinion for International Application No. PCT/US2024/026958, mailed Aug. 12, 2024, 13 Pages.

* cited by examiner

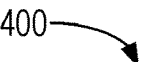
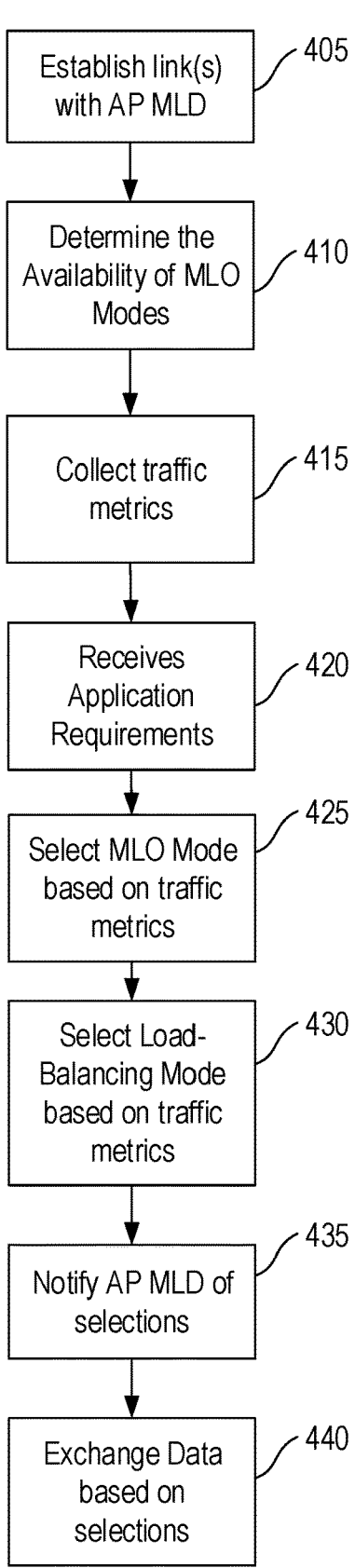
400
Establish link(s) with AP MLD — 405
Determine the Availability of MLO Modes — 410
Collect traffic metrics — 415
Receives Application Requirements — 420
Select MLO Mode based on traffic metrics — 425
Select Load-Balancing Mode based on traffic metrics — 430
Notify AP MLD of selections — 435
Exchange Data based on selections — 440
*FIG. 4*

500

Establish link(s) with STA MLD 505

Determine the Availability of MLO Modes 510

Unbalanced Traffic Demands? 515

Yes → Select NSTR or eMLSR Mode 530

No → Select STR Mode 520

Offload Criteria? 535

Yes

No

Notify STA MLD 525

Offload Traffic 540

Exchange data based on selections 545

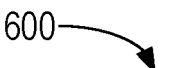

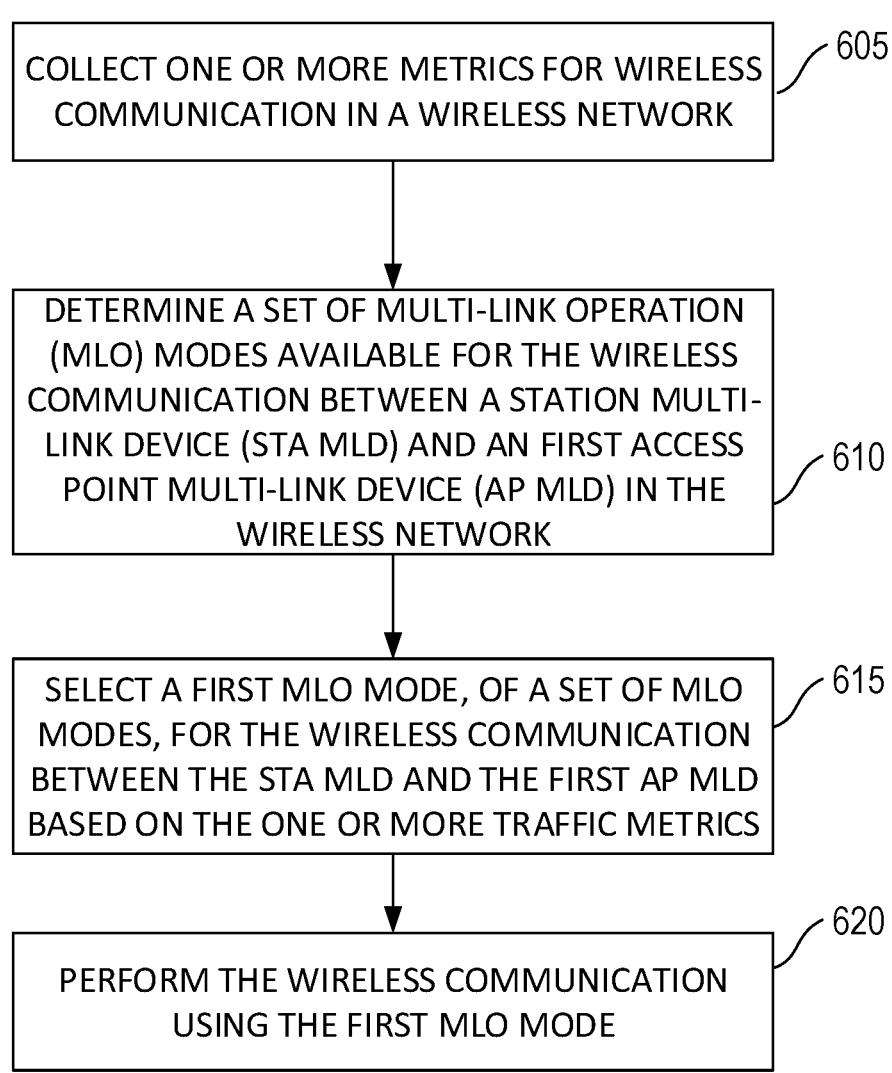

600 —

605
COLLECT ONE OR MORE METRICS FOR WIRELESS COMMUNICATION IN A WIRELESS NETWORK

610
DETERMINE A SET OF MULTI-LINK OPERATION (MLO) MODES AVAILABLE FOR THE WIRELESS COMMUNICATION BETWEEN A STATION MULTI-LINK DEVICE (STA MLD) AND AN FIRST ACCESS POINT MULTI-LINK DEVICE (AP MLD) IN THE WIRELESS NETWORK

615
SELECT A FIRST MLO MODE, OF A SET OF MLO MODES, FOR THE WIRELESS COMMUNICATION BETWEEN THE STA MLD AND THE FIRST AP MLD BASED ON THE ONE OR MORE TRAFFIC METRICS

620
PERFORM THE WIRELESS COMMUNICATION USING THE FIRST MLO MODE

*FIG. 6*

MULTI-LINK OPERATION (MLO) MODE SELECTION

CROSS-REFERENCE TO RELATED APPLICATIONS

This application claims benefit of U.S. provisional patent application Ser. No. 63/501,594 filed May 11, 2023. The aforementioned related patent application is herein incorporated by reference in its entirety.

TECHNICAL FIELD

Embodiments presented in this disclosure generally relate to wireless communication. More specifically, embodiments disclosed herein relate to multi-link operation (MLO) mode selection.

BACKGROUND

The Wi-Fi 802.11 standard has evolved from a single radio to a multi-radio technology, notably with the multi-link operation (MLO) features introduced by the IEEE 802.11be amendments. MLO generally involves to data transmission and/or reception using multiple links to one or more devices. MLO generally functions by distributing data across several frequency bands or channels, such as 2.4 GHz, 5 GHz, and/or 6 GHz. For example, a user or client device (e.g., smartphone, laptop, or other computing devices supporting MLO), may connect to one or more Access Points (APs) simultaneously through two separate links. The link 1 may utilize the 2.4 GHz band to provide the use with some stable and basic services. In contrast, the link 2 may utilize the 5 GHz band to provide the user with some high-speed and latency-sensitive (e.g., video gaming) services. Through the MLO, the user device may maintain both connections concurrently, and thereby optimizing the overall experience. This optimization can be achieved through a variety of operational modes, each designed to provide efficient data transmission and/or reception under different circumstances. Typically, there are three major modes used in MLO: simultaneous transmit and receive (STR) mode, non-simultaneous transmit and receive (NSTR) mode, as well as enhanced multilink single-radio (eMLSR) mode.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 4 depicts an example method for selecting MLO mode and load-balancing mode, according to some embodiments of the present disclosure.

FIG. 6 depicts a flow diagram depicting an example method for MLO mode selection for wireless communication according to some embodiments of the present disclosure.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
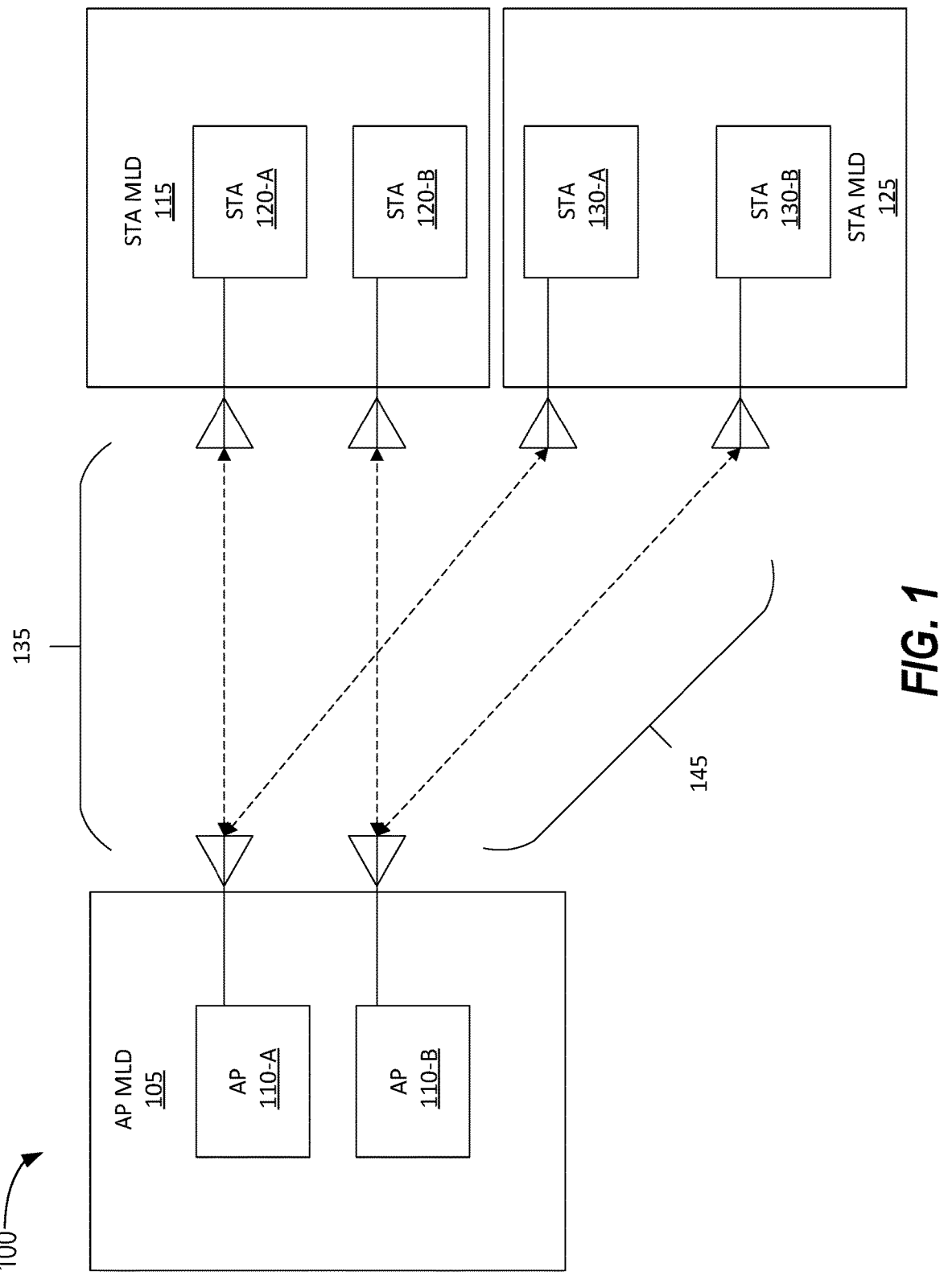
FIG. 1 depicts an example environment for intelligent MLO mode selection, according to some embodiments of the present disclosure.

One embodiment presented in this disclosure provides a method, including collecting one or more metrics for wireless communication in a wireless network; determining a set of multi-link operation (MLO) modes available for the wireless communication between a station multi-link device (STA MLD) and a first access point multi-link device (AP MLD) in the wireless network; selecting a first MLO mode, of the set of MLO modes, for the wireless communication between the STA MLD and the first AP MLD based on the one or more metrics; and performing the wireless communication using the first MLO mode.

Other embodiments in this disclosure provide non-transitory computer-readable mediums containing computer program code that, when executed by operation of one or more computer processors, performs operations in accordance with one or more of the above methods, as well as systems comprising one or more computer processors and one or more memories containing one or more programs which, when executed by the one or more computer processors, performs an operation in accordance with one or more of the above methods.

Example Embodiments

Embodiments of the present disclosure provide techniques and technologies for intelligent MLO mode selection for wireless communication.

In many conventional Wi-Fi systems, wireless communication is inherently half-duplex due to the nature of media access used in both contention (DCF/EDCA) environments, as well as 802.11ax Orthogonal Frequency Division Multiple Access (OFDMA) environments. With the development of Wi-Fi 7 MLO and Multi-Link Devices (MLDs), the possibility of achieving a pseudo full-duplex mode of operation is created by coordinating the use of multiple radios within the same network, which may lead to improved Wi-Fi performance, especially in high-density environments where multiple devices are competing for limited spectrum.

MLO generally involves the transmission and/or reception of data using multiple links in various frequency bands or channels, such as 2.4 GHz, 5 GHz, and/or 6 GHz, and MLO typically operates in three primary modes to facilitate its functionality: STR, NSTR and/or eMLSR. STR mode may be used as a full-duplex configuration across multiple radio links, (e.g., with one link used for upstream transmissions (such as from a non-AP MLD to an AP MLD) and the other used for downstream transmissions (such as from an AP MLD to a non-AP MLD)), both possibly active at the same time. NSTR mode is a half-duplex configuration across multiple radio links, in which each link can be either downstream, upstream, or both, but STR does not allow both (or all) links to be used at the same time. eMLSR mode provides one or more fully-functional (Tx/Rx) radio interfaces and, in some aspects, a partly-functional (Rx-only) radio interface to manage multiple links. Under the eMLSR mode, a fully-functional (Tx/Rx) radio interface may rapidly switch between links based on signals received by itself or signals received over a partly-functional (Rx-only) radio interface to transmit and receive data. eMSLR generally does not enable simultaneous transmissions/receptions on multiple links.

In some embodiments, the most optimal MLO mode (e.g., STR, NSTR and/or eMLSR) may change based on a variety of factors, such as the performance of the WLAN system and the specific requirements of an application executing on the MLD. As an example, depending on the observed performance and the unique demands of the application(s), it may be useful to adjust or update the MLO mode accordingly to ensure the most suitable and efficient communication. For example, primarily downstream applications (such as video streaming) that use high speed downloading may benefit from working under a half-duplex mode, whereas some interactive applications (such as online games, video conferencing, and the like) that use simultaneous data transmission (e.g., bidirectional transmissions) and low latency and jitter may experience improved performance under a full-duplex mode.

In addition, the three MLO modes support two main technical load balancing options: (1) packet-level balancing, where packets are load-balanced across the MLD links (e.g., per-packet load balancing), and (2) traffic-ID (TID) or flow-level balancing, where different flows are load-balanced across the MLD links (e.g., per-flow load balancing). In a similar to the MLO modes, the optimal load-balancing option may change depending on WLAN performance characteristics and application requirements. For example, packet-based load balancing can result in out-of-order packets, particularly if different radio interfaces operate at different speeds. Applications that employ stateless protocols (such as HTTP, DNS, or UDP) may benefit from packet-level load balancing since each request is handled independently without considering the contents of the packets, whereas applications that require a consistent flow of packets may experience reduced performance or even function failures when packet-based load balancing is selected.

Current approaches do not link the MLO modes or load balancing options to application types or working conditions/performance of the WLAN system. As a result, there are no conventional techniques available to facilitate or drive the selection of MLO modes and/or load balancing options. The present disclosure introduces a mechanism that allows non-AP MLDs and/or AP MLDs to influence or determine the selection of a more optimal MLO mode and/or load balancing mode for the wireless communication between them, based on data such as the specific application characteristics and/or the observed WLAN performance characteristics.

In one embodiment, the WLAN system may allow the upper layers (e.g., the logical link control (LLC) layer) of a station (STA) multi-link device (MLD) to access information from the medium access control (MAC) layer and the physical layer. Using this exposed lower-layer information, along with the specific application requirements, the upper layers of the STA MLD may determine the most suitable MLO mode and/or load balancing mode for the communications with each application in the network. In some embodiments, the selected MLO mode may be communicated by the STA MLD to its connected access point (AP) multi-link device (MLD), instructing the AP MLD to implement the selected mode.

In one embodiment, the connected AP MLD may perform the selection of MLO mode and/or load balancing option based on the performance characteristics of the WLAN system. In some embodiments, the AP MLD may continuously monitor the traffic load and performance of its radio interfaces with a STA MLD to determine the type of the application executing on the STA MLD (symmetrical, primarily-downstream, or primarily-upstream). Based on that, the AP MLD may select the optimal MLO mode and/or load balancing option for communications with this application. In some embodiments, the AP MLD may dynamically offload traffic from one radio interface to another based on the observed traffic load and performance characteristics of the network. The AP MLD may send a management frame to its connected STA MLD(s), instructing them to disconnect from the current radio interface and reconnect to an alternative radio interface.

FIG. 1 depicts an example environment 100 for intelligent MLO mode selection, according to some embodiments of the present disclosure. In the illustrated environment 100, an AP MLD 105 (e.g., an access point that acts as a multilink device) is communicatively coupled with a STA MLD 115 (e.g., a station or client device acting as a multilink device) via a set of links 135. The AP MLD 105 comprises two radio interfaces, AP 110-A and AP 110-B, each having a unique Basic Service Set Identifier (BSSID) for low-level networking. The STA MLD 115 also comprises two radio interfaces, STA 120-A and STA 120-B. Each interface of the STA MLD 115 has a unique Medium Access Control (MAC) address for low-level, hardware-based networking.

In the illustrated example, the AP MLD 105 is communicatively coupled with another STA MLD 125 (e.g., a station or client device acting as a multilink device) via a set of links 145. The STA MLD 125 comprises two radio interfaces, STA 130-A and STA 130-B, each having a unique MAC address. In some embodiments, the STA MLD 115 and the STA MLD 125 share a common virtual MAC address that represents the two STA MLDs as a single logical device when communications with other devices in the network.

In some embodiments, the links 135 and 145 correspond to wireless connections. In some embodiments, a link (e.g., 135 or 145) exists between each antenna of the AP MLD 105 and each antenna of the STA MLD (e.g., 115 or 125). In the illustrated example, links 135 exist between each AP 110 and a corresponding STA 120, links 145 exist between each AP 110 and a corresponding STA 130. For example, the AP 110-A has one or more links 135 connecting it to the STA 120-A, each link having a unique link ID. The AP 110-B has one or more links 135 connecting it to the STA 120-B, each link having a unique link ID. Similarly, the AP 110-A and the STA 130-A are connected by one or more links 145, and the AP 110-B and the STA 130-B are connected by one or more links 145. Each link 145 has a unique link ID. In some embodiments, each linked AP/STA pair may operate using a different frequency, as compared to other AP/STA pairs. For example, the AP 110-A and STA 120-A may use a first frequency band (e.g., 2.4 GHz), while AP 110-B and STA 120-B use a second band (e.g., 5 GHz). The AP 110-A and STA 130-A may use the first frequency band (e.g., 2.4 GHz), while AP 110-B and STA 130-B use the second band (e.g., 5 GHz).

The AP MLD 105 and STA MLDs 115 and 125 are generally representative of any device capable of performing multilink operations. Although an AP MLD 105 and STA MLDs 115 and 125 are depicted for conceptual clarity, in some embodiments, the MLO may be performed between any MLDs, including multiple AP MLDs, multiple STA MLDs, or any other MLDs. In the illustrated example, AP MLD 105 is depicted as having two radio interfaces, in some embodiments, the AP MLD 105 may use any number of APs 110 (including one). Similarly, though the STA MLDs 115 and 125 are depicted as each having two radio interfaces in illustrated example, in some embodiments, each STA MLD may have any number of STAs 120 (including one).

As illustrated, the APs 110 each have one antenna, in some embodiments, each AP 110 may have any number of antennas. Similarly, though the STAs 120 and 130 each have one antenna in the illustrated example, in embodiments, each STA 120 or 130 may have any number of antennas.

In some embodiments of the present disclosure, AP MLDs 105 and STA MLDs 115 and 125 may generally be referred to collectively as "MLDs" or "multilink devices," indicating that they are capable of using multiple communication links (e.g., 135 and 145), whether using one link at a time, or using multiple links in parallel to transmit and/or receive data. Additionally, in some embodiments, the AP MLD 105 may be generally referred to as simply an "AP," and each of the STA MLDs 115 and 125 may generally be referred to as simply a "STA" or "client device." Generally, the AP MLD 105 corresponds to an access point device that provides connectivity to a local wireless network (e.g., WiFi), while the STA MLDs 115 and 125 correspond to a station or client device connected to the local wireless network via the AP MLD 105.

In some embodiments, the STA MLD 115 may be used by and/or may host or implement one type of application (such as primary-downstream application that requires a large amount of downstream data transmission within a given time frame) to communicate with other devices in the network (or outside of the network, where such communications are transmitted via the network), while the STA MLD 130 may be used by another type of application (such as symmetrical application that requires an approximately equal quantity of upstream and downstream data transmission within a given time frame) to communicate with other devices in the network (or outside of the network).

In some embodiments, the AP MLD 105 and/or STA MLDs 115 and 125 may select a preferred MLO mode based on such application or traffic characteristics. For example, a primary-downstream application (such as video streaming) may use the linked AP/STA pairs between AP MLD 105 and STA MLD 115 (e.g., 110-A and 120-A, or 110-B and 120-B) to transmit and receive data under a half-duplex mode (e.g., NSTR mode or eMLSR mode). In contrast, an interactive application (such as video conferencing) that requires similar amounts of upstream and downstream traffic with low latency and jitter may use the linked AP/STA pairs between AP MLD 105 and STA MLD 125 (e.g., 110-A and 130-A, or 110-B and 130-B) to transmit and receive data under a full-duplex mode (e.g., STR mode). By assigning different types of applications (or types of traffic) to different MLDs and interfaces under various MLO modes, the system may optimize the performance for each application, and minimize the interference between applications with different traffic patterns.

In some embodiments, the system may prioritize the traffic flows for different applications based on various factors, such as application type, application-specific requirements and desired user experiences, and the system's Quality of Service (QoS) policy. In some embodiments, the system may mark the assigned priority levels using a Differentiated Services Code Point (DSCP) value. For example, interactive applications (such as video or voice conferencing) may be assigned a higher priority DSCP value, indicating their need for a symmetrical network connection (where upload and download speeds are similar) with low latency and jitter. Primary-downstream application (such as video streaming), in contrast, may be assigned a lower priority DSCP value, indicating a lower QoS requirements. In some embodiments, the assignment of DSCP values for different applications may be performed by the network administrator.

In some embodiments, an application running on the STA MLD 115 may generate data and specify the assigned DSCP value to be included in its data packets. The assigned DSCP value identifies how the data associated with the application should be handled. For example, a higher priority DSCP value may indicate that the application requires a symmetrical network connection with low latency and jitter, and therefore data associated with the application should be given high priority during resource allocations. In some embodiments, the application running on the STA MLD 115 may specify the assigned DSCP value for its network traffic by using socket API calls. When the data and the socket API calls generated by the application are received, STA MLD 115 starts the process of packaging the data into IP packets by adding one or more layers of headers to the data. When adding the IP header to a packet, the network layer of the transmitting STA MLD 115 includes the specified DSCP value in the DSCP field of the IP header. The network layer then passes the packet to the data link Layer, where the DSCP value is mapped to the corresponding Traffic Identifier (TID) value. In some embodiments, the mapping between DSCP value and TID value is defined by a translation table configured by the network administrator.

In some embodiments, the TID values may range from 0 to 7, and each value corresponds to a specific Access Category (AC) that is used to prioritize traffic. For example, TID values 0 and 1 may correspond to Background Traffic (AC_BK), which is the lowest priority traffic class and generally used for applications that are not time-sensitive (such as emails, file transfers, or software updates). TID values 2 and 3 may correspond to Best Effort Traffic (AC_BE), which is the default class for applications with no specific QoS requirements. TID values 4 and 5 may correspond to Video Traffic (AC_VI), which is designed for applications with moderate latency and jitter requirements, and that require primary downstreaming or upstreaming connections (such as video streaming). TID values 6 and 7 may correspond to Video Traffic (AC_VO), which is the highest priority class and is reserved for interactive applications with strict latency and jitter requirements and that request symmetrical network connections.

In some embodiments, information from the MAC layer and physical layer may be revealed to the upper layers, such as the logical link control (LLC) layer, which is the upper sub-layer of the data link layer. The upper layers of the STA MLD 115 may consider the mapped TID value (which indicates application-specific requirements and priority levels), along with the disclosed MAC layer and physical layer information, to select the optimal MLO mode and/or load balancing option for the communications with each application in the network. For example, the upper layers of the STA MLD 115 may be informed of the channel status of the links between the STA MLD 115 and AP MLD 105, the number of accessible physical layer interfaces (e.g., 120-A, 120-B, 110-A, or 110-B) and their respective MAC/BSSID addresses. The upper layers may also be aware that each interface can support STR, NSTR, or eMLSR modes, and/or packet-based or flow-based load balancing options. Based on the information from lower layers, the DSCP value specified by the application (which is subsequently mapped to a TID value), as well as traffic metrics monitored by the upper layers themselves, the upper layers (e.g., the LLC layer) of the STA MLD 115 may select the most appropriate MLO mode and/or load balancing option for transmitting and receiving data for the application.

In some embodiments, in response to the optimal MLO mode being selected by the upper layers (e.g., LLC layer), the STA MLD 115 may signal to its associated AP MLD 105, that a certain TID value (or group) will be used, and the desired MLO mode (STR, NSTR, or eMLSR) and/or load balancing option (packet-based or flow-based load balancing) for this value. In some embodiments, the communication of selected MLO mode is achieved by transmitting a management frame from the STA MLD 115 to AP MLD 105. For example, a data packet for a real-time application (such as an AGV app) is received by the LLC layer of the STA MLD 115. The data packet includes a DSCP value in the packet's IP header, which is then translated to a TID value at the LLC layer. The LLC layer determines that STR mode and packet-based load-balancing are preferred for the real-time application, and therefore creates a virtual MAC address for the TID value and sends a management frame to the AP MLD 105, indicating that data packets containing this TID value will be transmitted or received under the STR mode and packet-based load balancing option.

Figure 2:
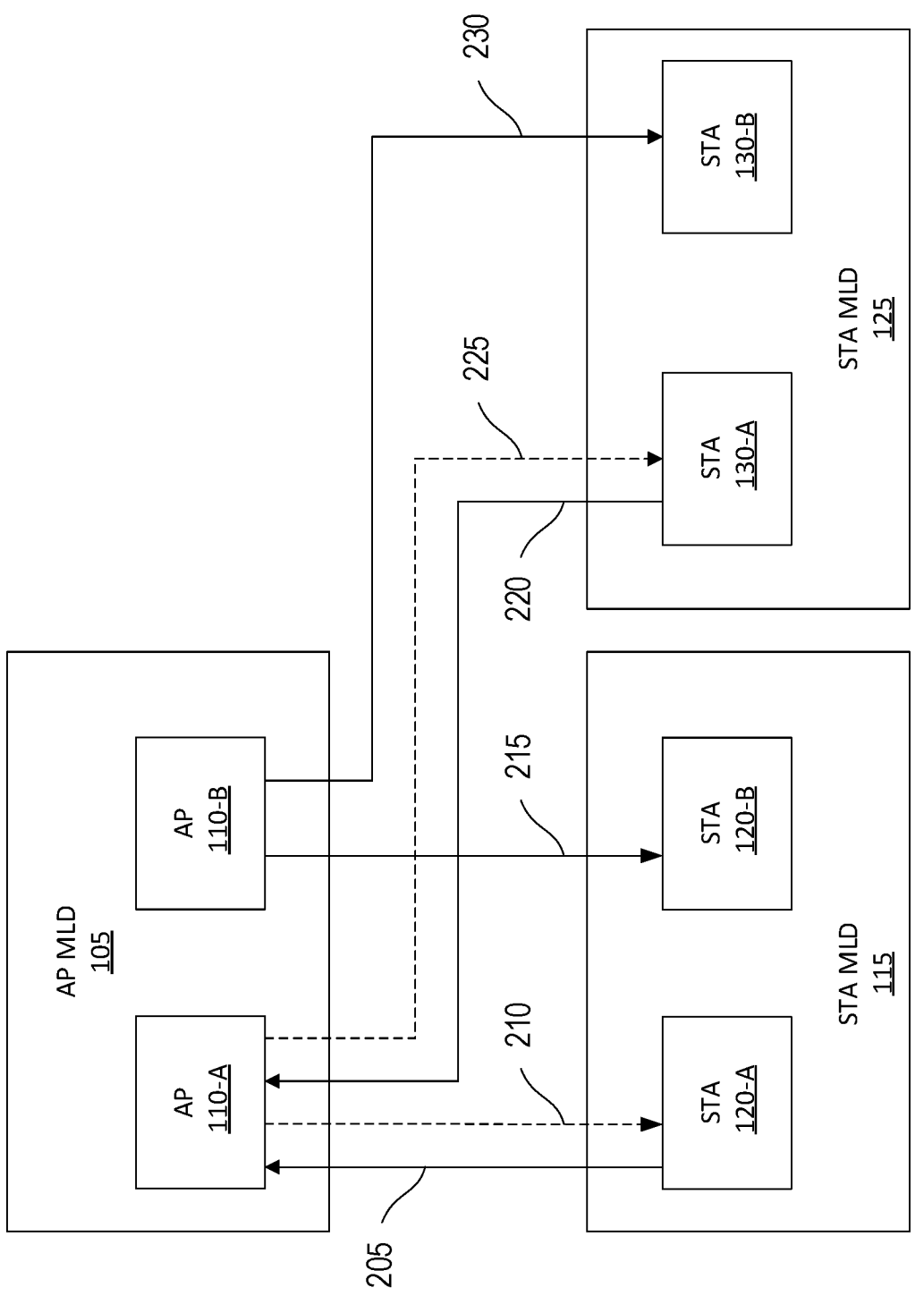
FIG. 2 depicts an example of radio interface switching in the system of FIG. 1, according to some embodiments of the present disclosure.

FIG. 2 depicts an example of radio interface switching in the system of FIG. 1, according to some embodiments of the present disclosure. In the illustrated environment 200, the linked pair of radio interfaces AP 110-A and STA 120-A handles upstream traffic 205 from STA MLD 115, and communicates downstream traffic 210 to STA MLD 115. For example, the AP MLD 105 may receive upstream traffic 205 from the connected device STA MLD 115 and then communicate that upstream traffic 205 towards its addressed destination in the network or other networks. The AP MLD 105 may receive downstream traffic 210 from other components in the network or from other networks and then communicate that downstream traffic 210 to the connected STA MLD 115. Similarly, the linked pair of radio interfaces AP 110-A and STA 130-A handles upstream traffic 220 from STA MLD 125, and communicates downstream traffic 225 to STA MLD 125.

In some embodiments, the AP MLD 105 may monitor the amount of upstream and/or downstream traffic being handled by the radio interface AP 110-A within a given time frame. If the AP MLD 105 determines the AP 110-A is experiencing asymmetrical traffic transmission (such as handling a much larger amount of upstream traffic compared with the amount of downstream traffic), the AP MLD 105 may assign most of its resources to handle the upstream traffic, leaving insufficient resources available to handle the downstream traffic. Similarly, the AP 110-A may simply be overwhelmed with or have insufficient resources to handle the volume of upstream traffic. As a result, the connected devices STA MLDs 115 and 125 may experience delays receiving downstream traffic 210.

In some embodiments, besides monitoring the amount of traffic being handled by the AP 110-A with STAs 120-A and 130-A, AP MLD 105 may also monitor the amount of upstream traffic awaiting at devices STA MLDs 115 and 125 by analyzing the buffer status reports from these devices. Using this information, AP MLD 105 may determine an aggregate upstream traffic demand from devices STA MLDs 115 and 125.

In some embodiments, AP MLD 105 may dynamically offload the downstream or upstream traffic to an alternative radio interface. For example, as illustrated, AP MLD 105 may shift the downstream traffic 210 and 225 (indicated by dashed arrows) at AP 110-A to AP 110-B (as indicated by arrows 215 and 230). The AP MLD 105 may also communicate this change to the connected user devices STA MLDs 115 and 125, instructing them to shift the downstream traffic to an alternative radio interface. The STA MLD 115, upon receiving the instruction, moves the downstream traffic from STA 120-A to STA 120-B, and starts to receive downstream traffic 215 (indicated by a solid arrow) from AP 110-B. The STA MLD 125, similarly, moves the downstream traffic from STA 130-A to STA 130-B upon receiving the instruction, and starts to receive downstream traffic 230 (indicated by a solid arrow) from AP 110-B. The linked pair of interfaces AP 110-A and STA 120-A may use different frequency bands. For example, the AP 110-A and STA 120-A may use the 5 GHz frequency band, while the linked pair of interfaces AP 110-B and STA 120-B may use 2.4 GHz frequency band. As a result, the STA MLD 115 may upload upstream traffic 205 using a faster speed band (e.g., 5 GHz), and receive downstream traffic 215 using a relatively slower speed band (e.g., 2.4 GHz). Similarly, the STA MLD 125 may upload upstream traffic 220 using a faster speed band (e.g., 5 GHz), and receive downstream traffic 230 using a relatively slower speed band (e.g., 2.4 GHz). By dynamically offloading downstream traffic to an alternative radio interface, the devices STA MLDs 115 and 125 may effectively communicate upstream traffic without interfering downstream traffic, and therefore improve the overall network performance.

In some embodiments, as stated above, AP MLD 105 may monitor the traffic patterns of the data flows being transmitted between itself and the devices it connected to, such as STA MLDs 115 and 125. For example, AP MLD 105 may examine the fill-in rates of both upstream and downstream buffers for each data flow being transmitted between the AP 110-A and STA 120-A. Based on the fill-in rates, AP MLD 105 may determine whether the application executing on the STA MLD 115 is a symmetrical application (where the upstream traffic demand and downstream traffic demand are approximately similar within a specified time frame), a primarily-downstream application (where the downstream traffic demand is larger than the upstream demand within a specific time frame), or a primarily-upstream application (where the upstream traffic demand is larger than the downstream demand within a specific time frame).

In some embodiments, the AP MLD 105, based on observed traffic patterns and determined aggregated traffic demands between itself and STA MLD 115, may select the most suitable MLO mode (e.g., STR, NSTR, or eMLSR), and/or load balancing options (e.g., packet-based or flow-based load balancing) to transmit and receive data for an application executing on its connected devices (e.g., STA MLDs 115 and 125). For example, a real-time interactive application (such as online gaming) is operating on STA MLD 115, and uploading and downloading data via the linked pair of interfaces AP 110-A and STA 120-A. Upon observing that the fill-in rates of upstream and downstream buffers for this application are similar, and that the aggregated upstream demand closely match the aggregated downstream traffic demand within a given time, the AP MLD 105 may determine that the real-time application is symmetrical, thus making the STR mode more suitable.

In some embodiments, a management frame from the AP MLD 105 to shift downstream or upstream traffic, and/or to implement the selected MLO mode and/or load balancing option is broadcasted to all MLO-capable STA MLDs (e.g., 115 and 125). In another embodiment, a unicast message may be used to communicate with a specific STA MLD, instructing the STA MLD that downstream or upstream traffic should be moved to an alternate radio interface, and/or that the selected MLO mode and/or load balancing option should be implemented.

Figure 3:
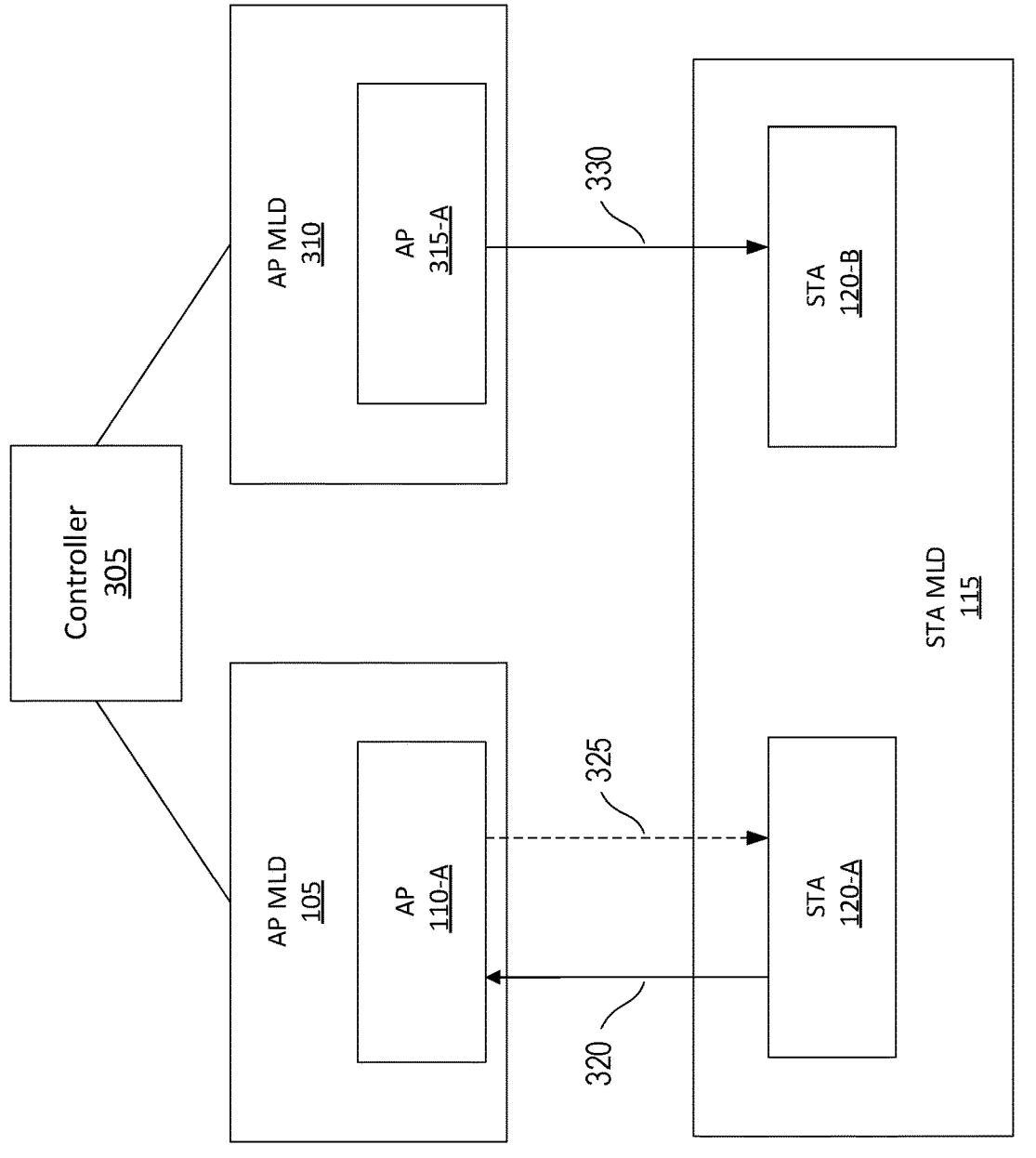
FIG. 3 depicts an example of radio interface switching in a system comprising multiple access point multi-link devices (AP MLDs), according to some embodiments of the present disclosure.

FIG. 3 depicts an example of radio interface switching in a system comprising multiple access point multi-link devices (AP MLDs), according to some embodiments of the present disclosure.

In the illustrated example, AP MLD 105 includes the radio interface AP 110-A, and AP MLD 310 includes the radio interface 315-A. Each of the AP MLDs 105 and 310 may include any suitable number of radio interfaces. In the illustrated example, STA MLD 115 includes two radio interfaces, STA 120-A and STA 120-B. The device STA MLD 115 may include any suitable number of radio interfaces (including one). Initially, the STA MLD 115 may have connected to the AP MLD 105 using the linked pair of interfaces AP 110-A and STA 120-A, and upstream and downstream traffic are communicated over this connection. For example, the radio interface STA 120-A may communicate upstream traffic 320 to the radio interface AP 110-A of the AP MLD 105, and the radio interface STA 120-A may receive downstream traffic 325 (indicated by the dashed arrow) as from the radio interface AP 110-A of the AP MLD 105.

As illustrated, the controller 305 monitors the upstream and downstream traffic from STA MLD 115 to the AP MLD 105. For example, the controller 305 may observe the amount of upstream traffic 320 and downstream traffic 325 being handled by the AP MLD 105, which is connected to STA MLD 115. In some embodiments, the controller 106 may monitor the buffer status reports received by the AP MLDs 105 and 310 from the STA MLD 115. These buffer status reports may indicate an amount of upstream traffic awaiting transmission at STA 120-A and STA 120-B of STA MLD 115, which provides an indication of the future upstream traffic that the AP MLD 105 will be expected to handle. In some embodiments, the controller 305 determines an aggregate upstream traffic demand for the AP MLD 105 by combining the observed upstream traffic 320 handled by the AP MLD 105 and the upstream traffic awaiting transmission at the STA 120-A indicated by the buffer status reports. If the aggregate upstream traffic demand for an access point (e.g., AP MLD 105) exceeds a threshold, the controller 305 may determine that the other access points (e.g., AP MLD 310) may assist in handling downstream traffic (and/or handling a portion of the upstream traffic). For example, in the illustrated example, if the controller 305 determines that the aggregate upstream traffic demand of the AP MLD 105 exceeds a threshold, the controller 106 may determine that the AP MLD 105 should shift the downstream traffic 325 (as indicated in dashed arrow) at the AP MLD 105 to the AP MLD 310. The controller 305 may communicate a message to the AP MLDs 105 and 310 to coordinate the shifting of the downstream traffic.

In some embodiments, when the AP MLDs 105 and 310 receive the message from the controller 305, they may communicate instructions to the STA MLD 115 that cause the STA MLD 115 to form two separate connections. As illustrated, the STA MLD 115 uses the radio interface STA 120-A to form a first connection with AP MLD 105, and uses the radio interface STA 120-B to form a second connection with AP MLD 310. The STA MLD 15 then uses the radio interface STA 120-A to communicate upstream traffic 320 to the AP MLD 105, and uses the radio interface STA 120-B to receive downstream traffic 330 from the AP MLD 310. The downstream traffic 325 from the AP MLD 105 (indicated by the dashed arrow) may be stopped or limited, and the bulk of the downstream traffic may be received from the AP MLD 310. As a result, the device STA MLD 115 may successfully communicate upstream traffic and successfully receive downstream traffic. The AP MLD 105 that does not have sufficient resources to handle both the upstream and downstream traffic is instead tasked with handling only the upstream traffic.

In some embodiments, the controller 305 may monitor the traffic patterns of the data flows being transmitted between AP MLDs and the devices they are connected to, such as STA MLD 115. Depending on the observed traffic patterns, the controller 305 may determine the optimal MLD mode and/or load balancing mode to implement, as discussed above. For example, the controller 305 may examine the fill-in rates of both upstream and downstream buffers for each data flow being transmitted between the AP MLDs (including 105 and 310) and STA MLD 115. If the controller 305 observes that the upstream and downstream fill-in rates are similar for shorter and longer intervals, the controller 305 may determine that the application running on the STA MLD 115 is symmetrical and may benefit from working under the STR mode. In some embodiments, the controller 305 may communicate a message to the AP MLDs 105 and 310, indicating the selected MLD mode (e.g., STR, NSTR, or eMLSR), and/or load balancing options (e.g., packet-based or flow-based load balancing). The AP MLDs 105 and 310, upon receiving the message, use a management frame to communicate the selected mode and/or load balancing option to its connected STA MLD 115.

In some embodiments, when the system does not include a controller, a primary AP MLD is configured to perform the operations of coordinating upstream or downstream traffic, and monitoring traffic patterns to determine the optimal MLO mode and/or load balancing option. The primary AP MLD may exchange messages with a secondary AP MLD (e.g., via a Distribution System (DS)), representing the upstream and/or downstream fill-in rates. Based on the exchanged fill-in rates, the primary AP MLD may determine the type of network connections (symmetrical, primary-downstream, or primary-upstream) the application running on its connected STA MLD requires, and select the most suitable MLO mode and/or load balancing option for the application. In some embodiments, the primary AP MLD may use a management frame to communicate the selected mode and/or load balancing option to its connected STA MLD.

FIG. 4 depicts an example method for selecting MLO mode and load-balancing mode, according to some embodiments of the present disclosure. In some embodiments, the illustrated method 400 may be performed by a STA MLD, such as STA MLD 115 of FIGS. 1-3.

At block 405, an STA MLD establishes one or more links with one or more AP MLDs in a WLAN network. For example, as illustrated in FIG. 1, the STA MLD 115 is communicatively coupled to the AP MLD 105 via a set of links 135. Each link exists between a linked pair of radio interfaces, such as STA 120-A and AP 110-A, and STA 120-B and AP 110-B. Each link may be used to transmit upstream and/or downstream data flows between the STA MLD and the AP MLD. In some embodiments, a single STA MLD may be connected to multiple AP MLDs, as depicted in FIG. 3. In some embodiments, a single AP MLD may be connected to multiple STA MLDs, as depicted in FIG. 1. In some embodiments, the multiple STA MLDs may share a virtual MAC address the represents the multiple STA MLDs as a single logical device when communicates with other devices in the network.

At block 410, the STA MLD determines the availability of MLO modes. In some embodiments, information from the MAC layer and physical layer may be revealed to the upper layer of the STA MLD (such as LLC layer). For example, the LLC layer of STA MLD 115 may be informed of the channel status of each link between itself and AP MLD 105, the number of accessible physical layer interfaces at STA MLD 115 and AP MLD 105 for communications (e.g., 120-A, 120-B, 110-A, or 110-B) and their respective MAC/BBSID addresses, as well as each radio interface's supported MLO modes (e.g., STR, NSTR, or eMLSR), and/or load balancing options (e.g., packet-based or flow-based load balancing). The information from lower layers may be used to select the optimal MLO mode and/or load balancing option for communications between the STA MLD 115 and the AP MLD 105.

At block 415, the STA MLD monitors and collects the traffic metrics for data being transmitted between itself and the AP MLD(s) to which the STA MLD is connected. The traffic metrics being tracked by the STA MLD may include the amount or volume of upstream and/or downstream traffic (e.g., number and/or size of packets) it handles within a given time frame (which in some embodiments referred to upstream and/or downstream throughput), upstream and/or downstream latency and jitter, packet loss or packet retransmission rate, and/or bandwidth utilization. For example, STA MLD 115 may monitor the amount of upstream and/or downstream traffic being handed by the linked pair of radio interfaces STA 120-A and AP 110-A, as depicted in FIG. 1. The STA MLD 115 may also monitor the amount of upstream traffic awaiting at its radio interfaces, such as STA 120-A and STA 120-B, and use the information to calculate an aggregated upstream traffic demand from STA MLD 115 to AP MLD 105.

At block 420, the STA MLD receives or determines the quality requirements of an application running on the STA MLD. In some embodiments, the system may prioritize the traffic flows for different applications based on the application type, its specific quality requirements and desired user experience, as well as the QoS policy of the system. In some embodiments, a DSCP value within IP header is used to signify the assigned priority level and application-specific requirements. For example, an interactive application (such as video or voice conferencing) may be assigned a higher priority DSCP value, indicating the application's demand for a symmetrical network connection (where upload and download speeds are similar) with low latency and jitter. A primarily-downstream application (such as video streaming) may be assigned a lower priority DSCP value, indicating a lower QoS requirements. The application may communicate the assigned DSCP value to its connected STA MLD using a socket call. For example, an interactive application that is assigned a high priority DSCP value (which corresponds to a TID value 6 or 7) may generate data and communicate the assigned DSCP value to STA MLD 115 by sending a socket call. The data and the socket call generated by the application is then received by the STA MLD 115, which follows the socket call and adds the specified DSCP values in the IP header of the data packets for the application. When the data packets are passed to data link layer, the DSCP value is mapped to a corresponding TID value. The mapped TID value informs the upper layers of the STA MLD 115 of the quality requirements and priority level of the interactive application.

At block 425, the STA MLD selects the more optimal or preferred MLO mode (e.g., STR, NSTR, eMLSR) for transmitting and receiving data between the STA MLD and its connected AP MLD(s), based at least in part on considering the received application-specific requirements and priority level (as indicated by the assigned DSCP/TID value), the tracked traffic metrics, and/or the revealed information from the MAC layer and physical layer. For example, as stated above, the mapped TID value for an interactive application running on the STA MLD may be 6 or 7, which indicates the application has a similar amount of upstream and downstream traffic demands and requires low latency and jitter. Based on this information and the tracked traffic metrics (such as the current upstream and/or downstream throughput, upstream and/or downstream latency and jitter, packet loss or packet retransmission rate, bandwidth utilization, and the like), as well as the revealed MAC layer information (the channel status of the links, two linked pairs of physical interfaces are available for transmission and their supported MLO modes, and the like), the STA MLD may determine that the interactive application would work most efficiently under the STR mode, and therefore STR mode should be selected.

At block 430, the upper layers (e.g., LLC layer) of the STA MLD select a more optimal or preferred load balancing option (e.g., packet-based or flow-based load balancing) for the transmission and reception of data between the STA MLD and its connected AP MLD(s), based at least in part on considering the received application-specific requirements and priority level, the collected traffic metrics, and/or the revealed information from the MAC layer and physical layer. For example, if it is determined that the interactive application running on the STA MLD 115 employs stateless protocols (HTTP, DNS, or UDP) that do not require a consistent and ordered flow of packets, the STA MLD 115 may select the packet-based load balancing to transmit and receive data between itself and the AP MLD 105. As such, the overall performance of the interactive application may be increased significantly.

At block 435, the STA MLD may communicate the selected MLO mode and/or load-balancing option to its connected AP MLD. For example, as discussed above, the STA MLD 115 may signal to the AP MLD 105 that a certain TID value (such as TID value 6 or 7 for the interactive application), the selected MLO mode (such as the STR mode), and/or the selected load-balancing mode (such as the packet-based load balancing) will be used for the data traffic associated with the interactive application. In some embodiments, the communication of selected MLO mode and/or load balancing option is achieved by transmitting a management frame from the STA MLD 115 to the AP MLD 105.

In some embodiments, the administrator of the network may associate DSCP values (or TID values) to specific MLO modes and/or load balancing options (e.g., defining a mapping), which would be the most suitable for a given application. As such, DSCP or TID values may be used to infer the desired MLO mode and/or load balancing option for transmitting data associated with the application.

At block 440, the selected MLO mode and/or load balancing option are implemented on the links between the STA MLD and its associated AP MLD, and the two devices begin to exchange data under the selected mode.

In some embodiments, the illustrated method 400 may be performed by an AP MLD, such as AP MLD 105, or AP MLD 310 of FIG. 3. In some embodiments, the illustrated method 400 may be performed by a controller, such as the controller 305 of FIG. 3.

Figure 5:
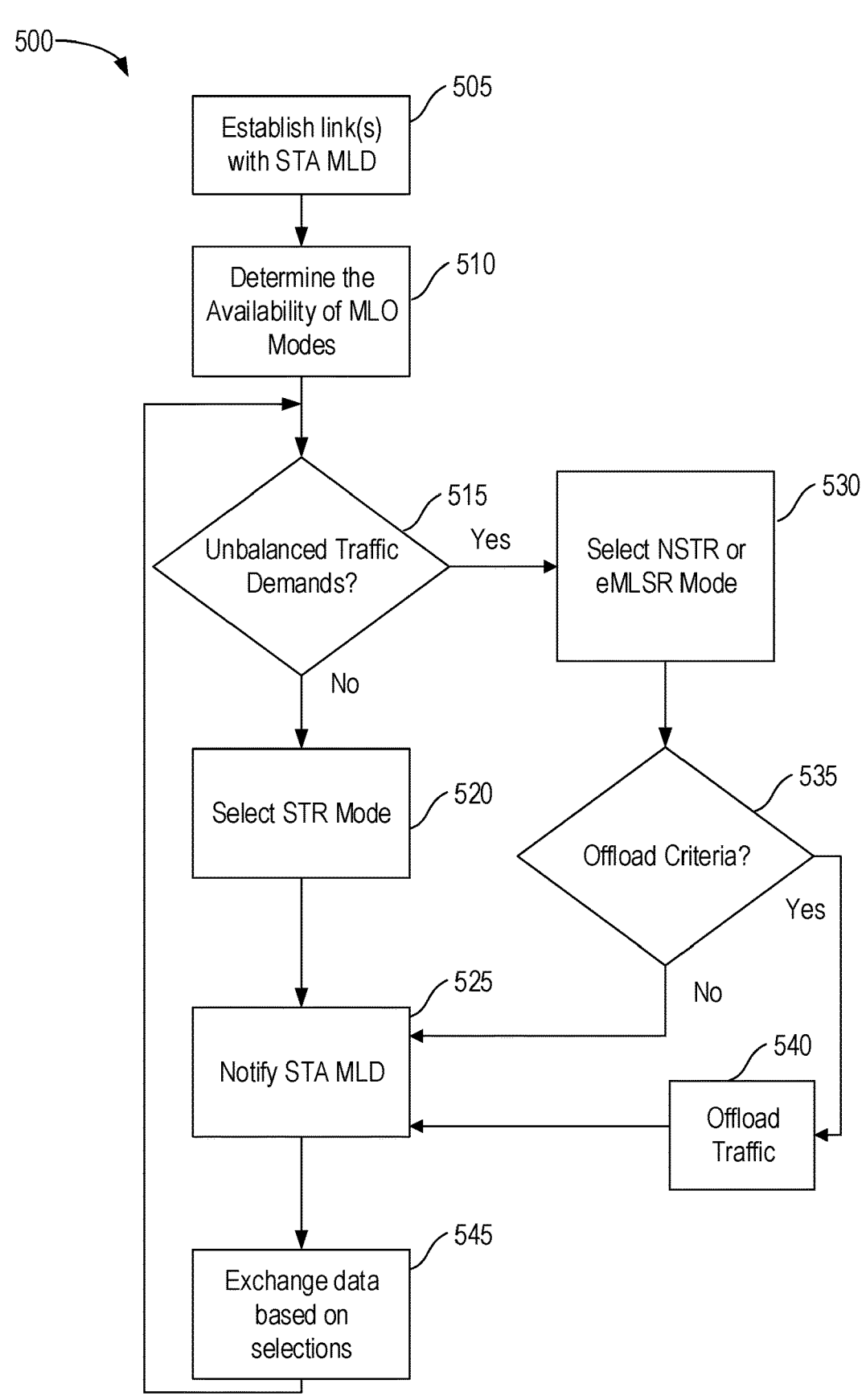
FIG. 5 depicts an example method for coordinating traffic between radio interfaces and selecting MLO mode, according to some embodiments of the present disclosure.

FIG. 5 depicts an example method for coordinating traffic between radio interfaces and selecting MLO mode, according to some embodiments of the present disclosure. In some embodiments, the illustrated method 500 may be performed by an AP MLD, such as AP MLD 105, or AP MLD 310 of FIG. 3. In some embodiments, the illustrated method 500 may be performed by a controller, such as the controller 305 of FIG. 3.

At block 505, an AP MLD establishes links with one or more STA MLDs in a WLAN network. For example, as illustrated in FIG. 2, the AP MLD 105 is communicatively coupled to two STA MLDs, such as STA MLD 115 and STA MLD 125. A set of links is established between the linked pairs of radio interfaces. For example, one or more links may be established between the linked pair of radio interfaces AP 110-A and STA 120-A, and each link may be used to transmit upstream (e.g., 205) and/or downstream traffic (e.g., 210). In some embodiments, when the network comprises two or more AP MLDs, a controller is configured to instruct the AP MLDs to establish links with their corresponding STA MLDs. For example, as illustrated in FIG. 3, the controller 305 is communicatively coupled to two AP MLDs, such as AP MLD 105 and AP MLD 310, and configured to coordinate the traffic between the two AP MLDs. Initially, the controller 305 may instruct the AP MLD 105 to connect to the STA MLD 115 using the linked pair of interfaces AP 110-A and STA 120-A. Upstream and downstream traffic are then communicated over the links established between AP 110-A and STA 120-A. For example, the radio interface STA 120-A may communicate upstream traffic 320 to the radio interface AP 110-A of the AP MLD 105, and the radio interface 120-A may receive downstream traffic 325 from the radio interface AP 110-A of the AP MLD 105.

At block 510, the AP MLD requests each of its connected STA MLDs to provide information about each STA MLD's MLO capabilities, including its supported MLO modes and/or load balancing options. In some embodiments, the capability information about the STA MLD, including supported MLO modes and/or load balancing options, may be included in an association request frame sent by a STA MLD to an AP MLD, when the STA MLD wants to connect to the AP MLD. The AP MLD, upon receiving the association request frame, gains an understanding of the STA MLD's MLO capabilities. In some embodiments, the AP MLD may use probe request frames to actively request capability information from its connected STA MLD. In some embodiments, when the network comprises two or more AP MLDs, a controller is configured to request and examine capability information about each connected STA MLD.

At block 515, the AP MLD determines whether the connected STA MLD has unbalanced traffic demands. In other words, the AP MLD determines whether the upstream and downstream traffic, currently being handled and/or to be handled within a given time frame between itself and its connected STA MLD is similar (an approximately equal quantity of upstream and downstream data is being transmitted and/or will be transmitted within a specific period of time). If the AP MLD determines the STA MLD has approximately similar upstream and downstream traffic demands, the method 500 proceeds to block 520, where the AP MLD may select the STR mode for implementation. If the AP MLD determines the STA MLD has unbalanced traffic demands, such as if the STA MLD requires a large amount of downstream data transmission and a small amount of upstream data transmission within a given time frame, the AP MLD may decide, at block 530, that the data transmission may benefit from operating under NSTR or eMLSR mode. Therefore, the AP MLD may select either NSTR or eMLSR mode for implementation.

In some embodiments, when the network comprises two or more AP MLDs, a controller is configured to determine the traffic demands of each STA MLD, and based on the determined traffic demands, to select the optimal MLO mode.

At block 535, upon determining that the connected STA MLD has unbalanced traffic demands, the AP MLD may determine whether the upstream or downstream traffic demands exceed an offload criteria. If so, the AP MLD may determine, at block 540, to offload some of the traffic to another AP MLD or another radio interface. For example, as illustrated in FIG. 2, AP MLD 105 may shift the downstream traffic 210 and 225 (indicated by the dashed arrow) from AP 110-A to AP 110-B. In some embodiments, a controller is configured to coordinate traffic between different AP MLDs, and instruct offloading upstream or downstream traffic from one AP MLD to an alternative AP MLD. For example, as illustrated in FIG. 3, the controller 305 may communicate a message to the AP MLDs 105 and 310, instructing the AP MLD 105 to offload its downstream traffic 325 from AP 110-A to AP 315-A of the AP MLD 310. If the upstream or downstream traffic demands have not exceeded the offload criteria, the AP MLD may continue to transmit or receive the data with its connected STA MLD.

At block 525, the AP MLD notifies its connected STA MLD of the selected MLO mode and/or the determination to offload some traffic from itself to an alternative AP MLD. In some embodiments, the information is communicated by broadcasting a management frame, from the AP MLD, to all MLO-capable STA MLDs that the AP MLD is connected to. In some embodiments, a unicast message may be used to communicate with a specific STA MLD, instructing the STA MLD that downstream or upstream traffic should be moved to an alternate radio interface, and/or that the selected MLD mode should be implemented.

At block 545, the AP MLD and its associated STA MLDs begin to exchange data under the selected MLO mode. The AP MLD or the WLAN controller continuously monitors the upstream and downstream traffic to determine whether the connected STA MLD has unbalanced traffic demands.

FIG. 6 is a flow diagram depicting an example method for MLO mode selection for wireless communication according to some embodiments of the present disclosure. In some embodiments, the method 600 is performed by an AP MLD, such as the AP MLD 105, or AP MLD 310 of FIG. 3. In some embodiments, the method 600 is performed by a controller, such as the controller 305 of FIG. 3. In some embodiments, the illustrated method 400 is performed by a STA MLD, such as the STA MLD 115 of FIGS. 1-3.

At block 605, one or more metrics for wireless communication in a wireless network is collected. In some embodiments, the one or more metrics include but not limited to the channel status of a plurality of links between a STA MLD and its connected first AP MLD, quality requirements of the application executing on the STA MLD (e.g., an interactive application that requests symmetrical data transmission with low latency and jitter), quality requirements of the wireless network (e.g., QoS policy of the network), and one or more traffic metrics for the wireless network (e.g., upstream and/or downstream traffic demands, upstream and/or downstream latency and jitter, packet loss or packet retransmission rate, and bandwidth utilization).

At block 610, a set of MLO modes available for the wireless communication between the STA MLD and its connected first AP MLD in the wireless network is determined. In some embodiments, the available MLO modes may include STR, NSTR, or eMLSR.

At block 615, a first MLO mode, of the set of MLO modes, for the wireless communication between the STA MLD and the first AP MLD is selected, based on the one or more metrics. In some embodiments, the operation of selecting the first MLD mode is performed by the STA MLD, such as STA MLD 115 of FIGS. 1-3. In some embodiments, the operation of selecting the first MLD mode is performed by the first AP MLD, such as AP MLD 105 or AP MLD 310 of FIG. 3.

At block 620, the wireless communication is performed using the first MLO mode.

Figure 7:
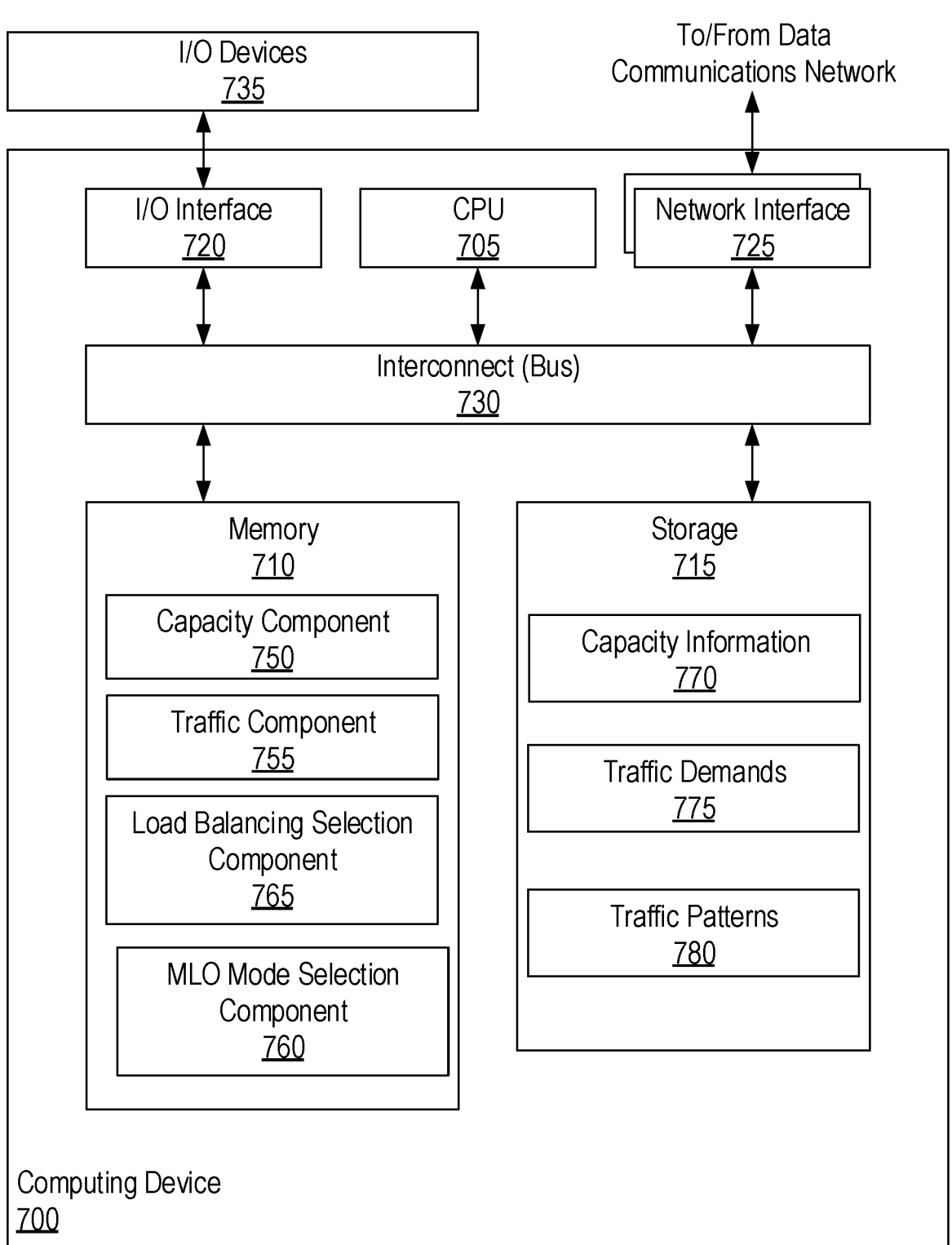
FIG. 7 depicts an example computing device configured to perform various aspects of the present disclosure, according to one embodiment.

FIG. 7 depicts an example computing device configured to perform various aspects of the present disclosure, according to one embodiment. Although depicted as a physical device, in embodiments, the computing device 700 may be implemented using virtual device(s), and/or across a number of devices (e.g., in a cloud environment). In one embodiment, the computing device 700 corresponds to an AP MLD, such as the AP MLD 105, or AP MLD 310 of FIG. 3. In some embodiments, the computing device corresponds to a controller, such as the controller 305 of FIG. 3. In some embodiments, the computing device corresponds to a STA MLD, such as the STA MLD 115 of FIGS. 1-3.

As illustrated, the computing device 700 includes a CPU 705, memory 710, storage 715, one or more network interfaces 725, and one or more I/O interfaces 720. In the illustrated embodiment, the CPU 705 retrieves and executes programming instructions stored in memory 710, as well as stores and retrieves application data residing in storage 715. The CPU 705 is generally representative of a single CPU and/or GPU, multiple CPUs and/or GPUs, a single CPU and/or GPU having multiple processing cores, and the like. The memory 710 is generally included to be representative of a random access memory. Storage 715 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 735 (such as keyboards, monitors, etc.) are connected via the I/O interface(s) 720. Further, via the network interface 725, the computing device 700 can be communicatively coupled with one or more other devices and components (e.g., via a network, which may include the Internet, local network(s), and the like). As illustrated, the CPU 705, memory 710, storage 715, network interface(s) 725, and I/O interface(s) 720 are communicatively coupled by one or more buses 730.

In the illustrated embodiment, the memory 710 includes a capacity component 750, a traffic component 755, a MLO mode selection component 760, and a load balancing selection component 765, which may perform one or more embodiments discussed above. Although depicted as discrete components for conceptual clarity, in embodiments, the operations of the depicted components (and others not illustrated) may be combined or distributed across any number of components. Further, although depicted as software residing in memory 710, in embodiments, the operations of the depicted components (and others not illustrated) may be implemented using hardware, software, or a combination of hardware and software.

In one embodiment, the capability component 750 may receive and aggregate capability information from MLO-capable devices, as discussed above. For example, the capability component 750 may determine the MLO capabilities of each radio interface within the device, as well as its MAC/BBSID address and supported channels and bands, and the like. In some embodiments, as discussed above, the capability component 750 can aggregate or summarize these capabilities (e.g., stored in capacity information 770). For example, the capability component 750 may determine the type of MLO that each device supports (e.g., STR, NSTR, eMLSR, and the like), and/or load balancing option each device supports (e.g., packet-based or flow-based load balancing).

In some embodiments, the traffic component 755 may determine current or future traffic needs or demands of the devices in the network. For example, the traffic component 760 may receive explicit indications of traffic (e.g., data amounts, timing, etc.) and/or indications relating to priority (e.g., QoS data) for communications among different devices (or applications). In some embodiments, this information can be stored or maintained in traffic demands 775. In some embodiments, when observing the upstream or downstream traffic demands exceed a pre-defined threshold, the traffic component may instruct the computing device 700 to offload some of the traffic to an alternative device or radio interface. In some embodiments, the traffic component 775 may monitor the traffic patterns (e.g., symmetrical, primary-downstream, or primary-upstream) of data being transmitted with other devices and save the information in traffic patterns 780.

In some embodiments, the MLO mode selection component 760 may select the most suitable MLO mode for communications being handled by the computing device 700 based on a variety of factors, including but not limited to the channel status of the links established between the device 700 with another device, the quality requirement of the application running on the device 700, QoS policy and traffic metrics of the network (e.g., upstream and/or downstream traffic demands, upstream and/or downstream latency and jitter, packet loss or packet retransmission rate, and bandwidth utilization), and MLO capacities of the device 700 (e.g., supported MLO modes, MAC/BBSID address of radio interfaces, and the like).

In some embodiments, the load balancing selection component 765 may select the most suitable load balancing mode for communications being handled by the computing device 700 based on a variety of factors, including but not limited to the channel status of the links established between the device 700 with another device, the quality requirement of the application running on the device 700 (e.g., protocol employed by the application, the application's tolerance of out-of-order packet, and the like), QoS policy and traffic metrics of the network (e.g., upstream and/or downstream traffic demands, upstream and/or downstream latency and jitter, packet loss or packet retransmission rate, and bandwidth utilization), and MLO capacities of the device 700 (e.g., supported load balancing options, MAC/BBSID address of radio interfaces, and the like).

In the illustrated example, the storage 715 includes capacity information 770 of the device(s) (e.g., supported MLO types, supported channels and bands, and the like), traffic demands 775, as well as traffic patterns 780. Although depicted as residing in storage 715, the capacity information 770, traffic demands 775 and traffic patterns 780 may be stored in any suitable location, including memory 710.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product.

Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:

collecting one or more metrics for wireless communication in a wireless network, the one or more metrics comprising a traffic classification value associated with an application executing on a station multi-link device (STA MLD);

determining a set of multi-link operation (MLO) modes available for the wireless communication between the STA MLD and a first access point multi-link device (AP MLD) in the wireless network;

selecting a first MLO mode, of the set of MLO modes, for the wireless communication between the STA MLD and the first AP MLD based on the one or more metrics; and performing the wireless communication using the first MLO mode.

2. The method of claim 1, wherein selecting the first MLO mode is performed by the STA MLD, and wherein the one or more metrics for selecting the first MLO mode further comprise at least one of (i) channel status of a plurality of links between the STA MLD and the first AP MLD, or (ii) a number of accessible physical layer interfaces at the STA MLD and the first AP MLD for communication; (iii) the media access control (MAC) addresses or basic service set identifiers (BSSIDs) of the STA MLD and the first AP MLD; or (iv) one or more supported MLO modes by the STA MLD and the first AP MLD.

3. The method of claim 1, wherein the traffic classification value is encoded within at least one of a plurality of data packets transmitted between the STA MLD and the first AP MLD.

4. The method of claim 3, wherein the STA MLD transmits, to the first AP MLD, a mapping that links the first MLO mode to the traffic classification value via a management frame.

5. The method of claim 1, wherein selecting the first MLO mode is performed by the first AP MLD, and wherein the one or more metrics for selecting the first MLO mode further comprise at least one of (i) channel status of a plurality of links between the STA MLD and the first AP MLD, (ii) a number of accessible physical layer interfaces at the STA MLD and the first AP MLD for communication; (iii) the media access control (MAC) addresses or basic service set identifiers (BSSIDs) of the STA MLD and the first AP MLD; or (iv) one or more supported MLO modes by the STA MLD and the first AP MLD.

6. The method of claim 5, wherein:
the plurality of links between the STA MLD and the first AP MLD comprises a first link and a second link, and
the first MLO mode is selected to offload at least a portion of a plurality of data packets from the first link to the second link, based at least in part on one of (i) channel status of the first link, (ii) channel status of the second link, or (iii) the traffic classification value associated with the application executing on the STA MLD.

7. The method of claim 6, wherein:
the first link is used as an upstream link to transmit uplink data packets of the plurality of data packets between the STA MLD and the first AP MLD, and
the second link is used as an downstream link to transmit downlink data packets of the plurality of data packets between the STA MLD and the first AP MLD.

8. The method of claim 1, wherein the first MLO mode is selected by the first AP MLD and is communicated to the STA MLD via a management frame.

9. The method of claim 1, wherein:
the wireless network further comprises a second AP MLD,
the STA MLD receives downlink data packets from the wireless network via the second AP MLD, and
the STA MLD transmits uplink data packets to the wireless network via the first AP MLD.

10. The method of claim 9, wherein:
the second AP MLD determines a traffic pattern for transmitting the downlink data packets, and
the first AP MLD determines a traffic pattern for transmitting the uplink data packets, and the first MLO mode is selected based at least in part on comparing traffic pattern for transmitting the downlink data packets and the traffic pattern for transmitting the uplink data packets.

11. The method of claim 1, wherein the set of MLO modes comprises at least one of (i) simultaneous transmit and receive (STR) operation mode, (ii) non-simultaneously transmit and receive (NSTR) operation mode, or (iii) enhanced multilink single-radio (eMLSR) operation mode.

12. The method of claim 1, further comprising selecting a first load-balancing mode, of a set of load-balancing modes, for the wireless communication between the STA MLD and the first AP MLD.

13. The method of claim 12, wherein selecting the first load-balancing mode is performed by the first AP MLD based at least in part on (i) a transport protocol used by an application connected the STA MLD, (ii) the traffic classification value associated with the application executing on the STA MLD, or (iii) one or more supported load-balancing modes by the STA MLD and the first AP MLD.

14. The method of claim 12, wherein:
selecting the first load-balancing mode is performed by the STA MLD based at least in part on (i) a transport protocol used by an application connected to the STA MLD, (ii) the traffic classification value associated with the application executing on the STA MLD, or (iii) one or more supported load-balancing modes by the STA MLD and the first AP MLD, and
the STA MLD communicates the first load-balancing mode to the first AP MLD via a management frame.

15. The method of claim 12, wherein the traffic classification value is encoded within at least one of a plurality of data packets transmitted between the STA MLD and the first AP MLD and is mapped to the first load-balancing mode.

16. The method of claim 12, wherein the set of load-balancing modes comprises at least one of (i) flow-based load-balancing mode, or (ii) packet-based load-balancing mode.

17. A system, comprising:
one or more computer processors; and
a memory containing a program which when executed by the one or more computer processors performs an operation, the operation comprising:
collecting one or more metrics for wireless communication in a wireless network, the one or more metrics comprising a traffic classification value associated with an application executing on a station multi-link device (STA MLD);
determining a set of multi-link operation (MLO) modes available for the wireless communication between the STA MLD and a first access point multi-link device (AP MLD) in the wireless network;
selecting a first MLO mode, of the set of MLO modes, for the wireless communication between the STA MLD and the first AP MLD based on the one or more metrics; and
performing the wireless communication using the first MLO mode.

18. The system of claim 17, wherein selecting the first MLO mode is performed by the STA MLD, and wherein the one or more metrics for selecting the first MLO mode further comprise at least one of (i) channel status of a plurality of links between the STA MLD and the first AP MLD, or (ii) a number of accessible physical layer interfaces at the STA MLD and the first AP MLD for communication; (iii) the media access control (MAC) addresses or basic service set identifiers (BSSIDs) of the STA MLD and the first AP MLD; or (iv) one or more supported MLO modes by the STA MLD and the first AP MLD.

19. The system of claim 17, wherein selecting the first MLO mode is performed by the first AP MLD, and wherein the one or more metrics for selecting the first MLO mode further comprise at least one of (i) channel status of a plurality of links between the STA MLD and the first AP MLD, (ii) a number of accessible physical layer interfaces at the STA MLD and the first AP MLD for communication; (iii) the media access control (MAC) addresses or basic service set identifiers (BSSIDs) of the STA MLD and the first AP MLD; or (iv) one or more supported MLO modes by the STA MLD and the first AP MLD.

20. A non-transitory computer-readable medium containing computer program code that, when executed by operation of one or more computer processors, performs an operation comprising:

collecting one or more metrics for wireless communication in a wireless network, the one or more metrics comprising a traffic classification value associated with an application executing on a station multi-link device (STA MLD);

determining a set of multi-link operation (MLO) modes available for the wireless communication between the STA MLD and a first access point multi-link device (AP MLD) in the wireless network;

selecting a first MLO mode, of the set of MLO modes, for the wireless communication between the STA MLD and the first AP MLD based on the one or more metrics; and performing the wireless communication using the first MLO mode.

\* \* \* \* \*